US012774203B2

(12) United States Patent
Contessini et al.

(10) Patent No.: US 12,774,203 B2
(45) Date of Patent: Oct. 27, 2026

(54) MULTIFUNCTIONAL LIFTING VEHICLE AND RELATIVE MIXED-REALITY VIEWER DEVICE

(71) Applicant: Merlo Project S.r.l., Cervasca Cuneo (IT)

(72) Inventors: Felice Contessini, Cervasca Cuneo (IT); Federico Lopez, Cervasca Cuneo (IT)

(73) Assignee: Merlo Project S.r.l., Cervasca Cuneo (IT)

(*) Notice: Subject to any disclaimer, the term of this patent is extended or adjusted under 35 U.S.C. 154(b) by 14 days.

(21) Appl. No.: 18/883,224

(22) Filed: Sep. 12, 2024

(65) Prior Publication Data

US 2025/0091852 A1 Mar. 20, 2025

(30) Foreign Application Priority Data

Sep. 14, 2023 (IT) ........................ 102023000018924

(51) Int. Cl.
*B66F 17/00* (2006.01)
*B66F 9/065* (2006.01)
(Continued)

(52) U.S. Cl.
CPC .......... *B66F 17/003* (2013.01); *B66F 9/0655* (2013.01); *B66F 9/0755* (2013.01); *B66F 9/22* (2013.01); *H04N 23/90* (2023.01)

(58) Field of Classification Search
None
See application file for complete search history.

(56) References Cited

U.S. PATENT DOCUMENTS 12,448,756 B2 * 10/2025 Bhupatiraju ............ E02F 9/261
2019/0340909 A1 * 11/2019 Nguyen ................ B25J 9/1676
(Continued)

FOREIGN PATENT DOCUMENTS

CN 104662389 A 5/2015
CN 112479037 A * 3/2021 ............ B66C 23/88
(Continued)

OTHER PUBLICATIONS

Search Report dated Jan. 29, 2025. 10 pages.
Search Report dated Mar. 25, 2024. 45 pages.

*Primary Examiner* — Peter D Nolan
*Assistant Examiner* — Jacob Kent Besteman-Street
(74) *Attorney, Agent, or Firm* — RMCK Law Group PLC

(57) ABSTRACT

A multifunctional lifting vehicle includes: a base frame, a lifting assembly including an operating arm equipped with an attachment for mounting a tool, a control system of the lifting assembly, having an electronic control unit and sensors arranged to acquire vehicle stability data, including a position of the arm with respect to the frame and an amount of load lifted by the tool, a vision system mounted on the frame, having a camera to acquire images and detect events occurring outside the vehicle, and a detection device to measure an object's distance outside the vehicle, detected by the camera, and a mixed-reality viewing device of a head-up display type with video, operationally connected to the control unit for generating, on the basis of data acquired by the vision system, three-dimensional information on the surrounding environment which assists in driving and managing the lifted load.

15 Claims, 8 Drawing Sheets

(51) Int. Cl.

| | |
|---|---|
| ***B66F 9/075*** | (2006.01) |
| ***B66F 9/22*** | (2006.01) |
| ***H04N 23/90*** | (2023.01) |

(56) References Cited

U.S. PATENT DOCUMENTS

| | | | | |
|---|---|---|---|---|
| 2020/0048052 | A1 | 2/2020 | Lyngbäck et al. | |
| 2020/0198939 | A1 | 6/2020 | Kosaka et al. | |
| 2021/0381203 | A1 | 12/2021 | Itoh et al. | |
| 2022/0136215 | A1* | 5/2022 | Shiratani | E02F 3/962<br>701/50 |
| 2022/0194769 | A1* | 6/2022 | Kobel | G01S 17/88 |
| 2022/0234867 | A1 | 7/2022 | Hayashi et al. | |
| 2023/0035181 | A1 | 2/2023 | Lee et al. | |
| 2024/0175244 | A1* | 5/2024 | Bhupatiraju | G06T 7/60 |

FOREIGN PATENT DOCUMENTS

| | | | | |
|---|---|---|---|---|
| EP | 3495316 | A1 * | 6/2019 | B66F 9/24 |
| EP | 3926107 | A1 | 12/2021 | |

* cited by examiner

MULTIFUNCTIONAL LIFTING VEHICLE AND RELATIVE MIXED-REALITY VIEWER DEVICE

CROSS-REFERENCE TO RELATED APPLICATION

This application claims priority to Italian Patent Application No. 102023000018924 filed Sep. 14, 2023. The disclosure of the above application is incorporated herein by reference in its entirety.

FIELD OF THE INVENTION

The present invention relates to a multifunctional lifting vehicle comprising:

- a base frame,
- a lifting assembly including at least one operating arm equipped with a connection section for mounting a tool,
- a control system of the lifting assembly, comprising at least one electronic control unit and a plurality of sensors arranged to acquire a plurality of stability data of the vehicle, including the position of the arm relative to the base frame, and the amount of load lifted by the tool.

PRIOR ART

Lifting vehicles of the type indicated above may be equipped with different types of tools, such as for example forks, shovels, aerial platforms, etc. During operation, the load applied to the tool located at the end of the arm may vary widely.

These vehicles are equipped with a load diagram which prescribes the maximum load that can be applied to the end of the lifting arm depending on the position of the arm. Therefore, the load diagram is calculated and made available to the operator, in order to comply with the safety requirements relating to vehicle stability, defining the vehicle maneuvers that ensure stability against overturning.

Currently, the operator controlling the vehicle (from inside the driving cab or from a remote location) may in some cases have his view obstructed by objects that interpose themselves along his field of vision. In particular, external objects or parts of the vehicle itself (such as the front uprights forming the driving cab or other parts of the frame) may prevent a complete view of the surrounding environment from different angles, generating significant difficulties in maneuvering the vehicle itself or in moving the load raised at the end of the lifting arm, in compliance with the safety and stability requirements indicated above. In this context, the documents US2022136215A1 and EP3495316B1 describe vehicles equipped with a related data acquisition system to detect information useful for managing a lifted load.

However, there is still a need to propose an improved solution.

OBJECT OF THE INVENTION

The aim of the present invention is to overcome the technical problems previously described.

In particular, it is an object of the present invention to create a lifting vehicle of the type indicated above, designed to assist the operator in driving and managing the load, even in specific circumstances which determine non-visible areas and difficult to predict scenarios that may be critical for the safety and stability of the vehicle.

A further object of the invention is to implement such a solution with relatively simple and low-cost means, without requiring any particular knowledge from the operator who drives the aforesaid vehicle from the cab or remotely.

SUMMARY OF THE INVENTION

The object of the present invention is achieved by a lifting vehicle having the characteristics forming the subject of one or more of the claims that follow, which form an integral part of the technical disclosure given here in relation to the invention.

In particular, the object of the invention is achieved by a multifunctional lifting vehicle comprising:

- a base frame,
- a lifting assembly including at least one operating arm equipped with a connection section for mounting a tool,
- a control system of the lifting assembly, comprising at least one electronic control unit and a plurality of sensors arranged to acquire a plurality of stability data of the vehicle, including the position of the arm relative to the base frame and the amount of load lifted by the tool, characterized in that said multifunctional lifting vehicle also comprises:

- a vision system mounted on the base frame, comprising at least one camera configured to acquire images and detect events occurring outside the vehicle, and at least one detection device to measure the distance of an object outside the vehicle,
- a mixed-reality viewer device of the head-up display type with video pass-through, operatively connected to said electronic control unit, configured and programmed to generate a mixed-reality visualization of the surrounding environment, by combining the real physical environment with virtual elements specifically generated to facilitate in real time driving of the vehicle and the load management.

The invention is also directed to a method for managing a load moved by means of a multifunctional lifting vehicle, as indicated in the attached claim 15.

BRIEF DESCRIPTION OF THE FIGURES

Further characteristics and advantages of the invention will become apparent from the description that follows with reference to the attached drawings, provided purely by way of non-limiting example, wherein.

DETAILED DESCRIPTION OF THE EMBODIMENTS OF THE INVENTION

In the following description various specific details are illustrated aimed at a thorough understanding of examples of one or more embodiments. The embodiments may be implemented without one or more of the specific details, or with other methods, components, materials, etc. In other cases, known structures, materials or operations are not shown or described in detail to avoid obscuring various aspects of the embodiments.

The reference to "an embodiment" in the context of this description indicates that a particular configuration, structure or characteristic described in relation to the embodiment is included in at least one embodiment. Therefore, phrases such as "in an embodiment", possibly present in different places of this description do not necessarily refer to the same embodiment.

Moreover, particular conformations, structures or characteristics can be combined in a suitable manner in one or more embodiments and/or associated with the embodiments in a different way from that illustrated here, for example, a characteristic here exemplified in relation to a figure may be applied to one or more embodiments exemplified in a different figure.

The references illustrated here are only for convenience and do not therefore delimit the field of protection or the scope of the embodiments.

Figure 1:
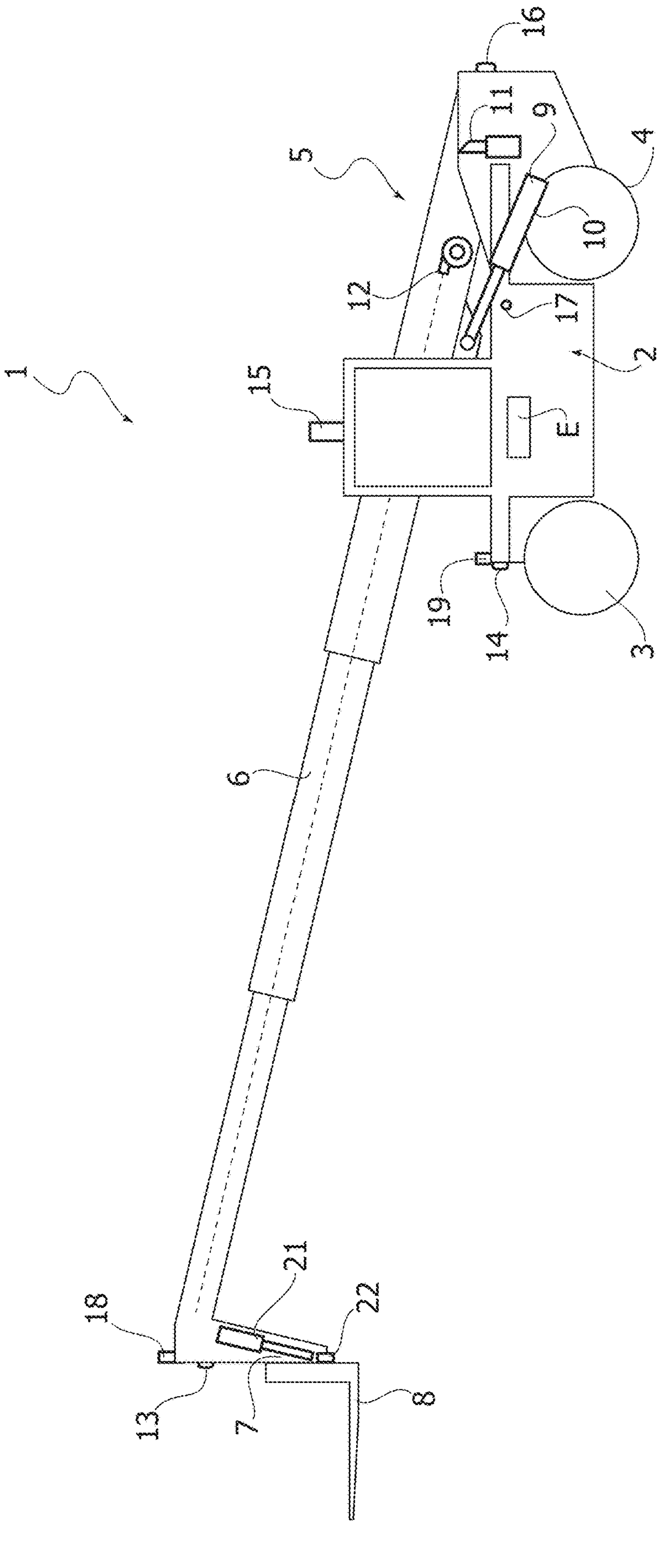
FIG. 1 is a schematic side view of a multifunctional lifting vehicle according to of an embodiment of the present invention.

With reference to FIG. 1, numeral 1 indicates a multifunctional lifting vehicle according to a preferred embodiment of the present invention.

The vehicle 1 includes a base frame 2 equipped with front support means 3 and rear support means 4, for example, wheels and/or stabilizers. The base frame 2 may be advantageously made in the form of a fixed, self-propelled or rotating frame.

The vehicle 1 also comprises a lifting assembly 5 comprising at least one operating arm 6 articulated in the rear section of the frame 2 about a transverse axis.

The lifting assembly 5 may advantageously comprise a single operating arm 6 or two arms articulated together. One or more of said arms 6 may be telescopic, as illustrated in FIG. 1, configured so as to vary the prominence with respect to the base frame 2.

Again, with reference to FIG. 1, the actuation assembly 5 is equipped at one of its terminal ends with an attachment 7 for connecting different types of tools 8, such as for example forks, shovels, aerial platforms, etc.

In a way known in itself, the vehicle 1 also comprises a drive system configured to operate the lifting assembly 5 carrying the tool 8. In one or more embodiments the drive system comprises at least one lifting/lowering cylinder 9 with ends articulated to the frame 2 and to the arm 6. In one or more embodiments, the drive system may further comprise a hydraulic drive circuit including a main pump driven by a motor of the vehicle. The details relating to the hydraulic circuit are not described here, as they are widely known to the expert in the field in question.

According to a further characteristic, the multifunctional lifting vehicle 1 comprises a control system associated with the drive system of the vehicle 1. The control system comprises an electronic control unit E arranged to control, among other things, respective operating valves of a hydraulic circuit for the operation of the lifting assembly 5, also as a function of a plurality of sensors detailed below.

In one or more embodiments, the control system comprises a load sensor 10, which provides an indication of the intensity of the load applied to the end of the lifting arm 6. The load sensor 10 may, for example, be made in the form of a load cell applied to the lifting/lowering cylinder 9.

The control system may also comprise sensors 11, 12 which respectively detect the inclination angle of the arm and the extension length of the telescopic portion of the arm 6.

The control system may further comprise at least one sensor 21 for determining the inclination angle of the tool mounted at the end of the arm (raft angle sensor).

According to further characteristics, the control system may further comprise one or more sensors to detect the load on the support means 3, 4 of the vehicle 1 and possibly to detect the extension of the stabilizers and/or the rotation angle of an upper portion of the frame 2.

According to a further characteristic, the control system may comprise a recognition unit 22 configured for recognizing the type of equipment applied to the arm 6. The recognition unit 22 may, for example, be based on RFID technology.

According to a further characteristic, the electronic control unit E can be configured to autonomously define a load diagram of the vehicle 1 based on various operating parameters of the vehicle, including those detected by the sensors described above, and the type of tool 8 connected to the arm 6.

The load diagram schematically shows an operational working area within which the vehicle is operated in conditions of safety with respect to overturning. In fact, the expression working area means a safe operating space, defined as having a known load on the tool and the type of connected tool, as well as any other parameters revealed by the sensors as indicated above.

Figure 2:
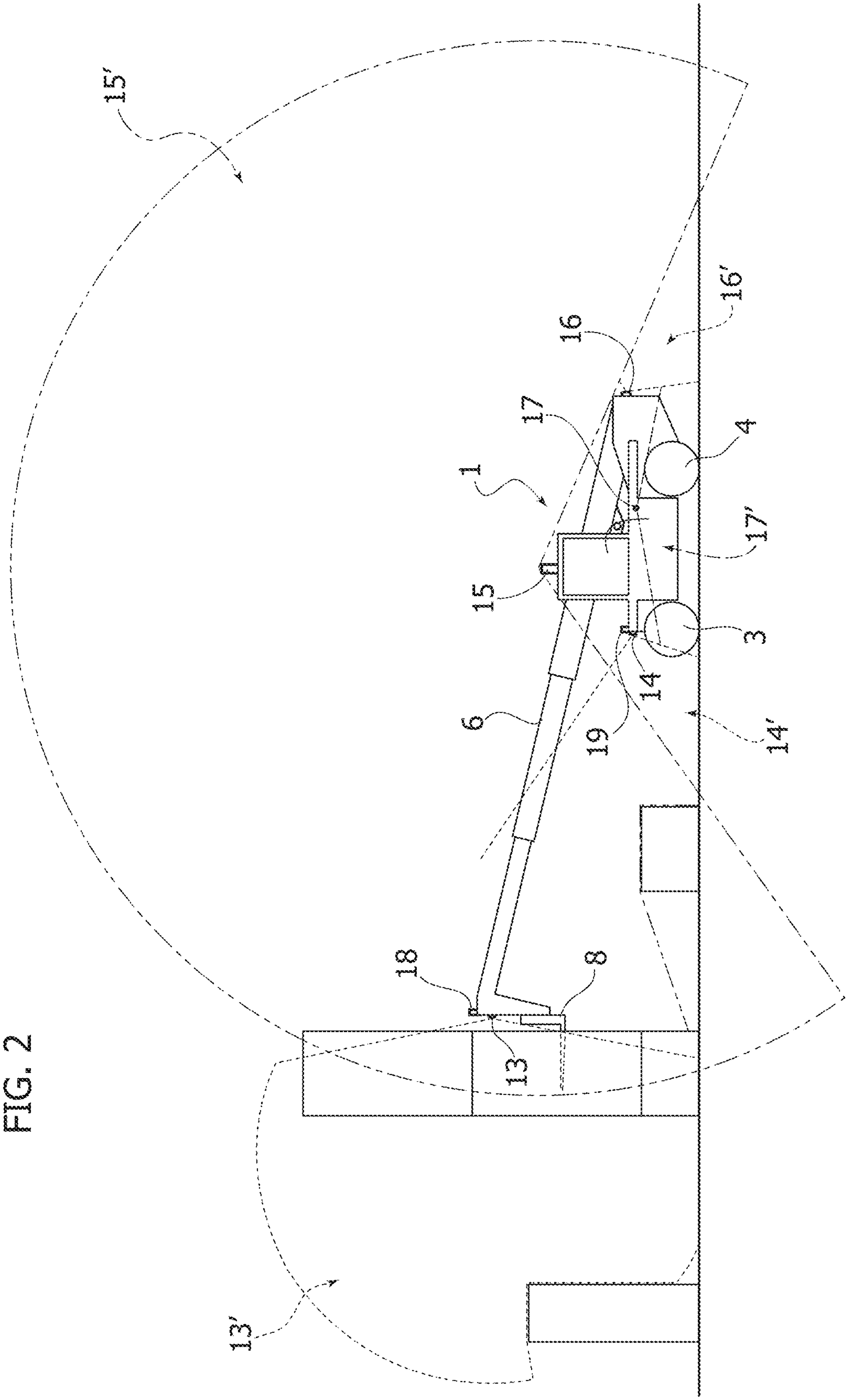
FIGS. 2, 3 are schematic views of the vehicle showing different detection areas of a vision system.
Figure 3:
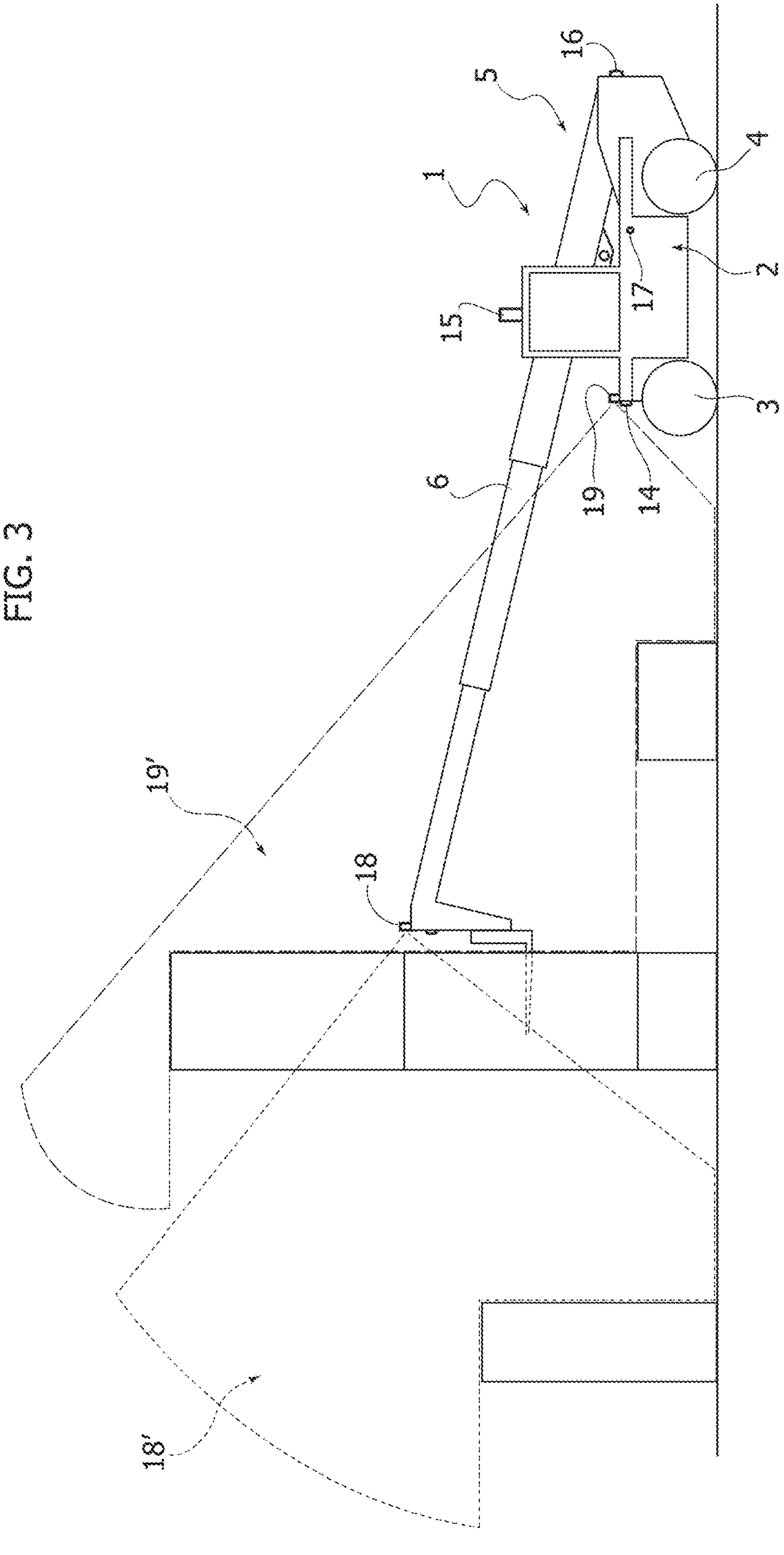

According to an essential characteristic of the present invention, illustrated by way of example in FIGS. 1-3, the lifting vehicle 1 further comprises a vision system mounted on the frame 2, comprising:

- at least one camera configured to acquire images and detect events occurring outside the vehicle 1 in the direction wherein that camera is facing, and
- at least one sensing instrument for detecting the distance of an object external to the vehicle 1.

In one or more embodiments, as illustrated in FIG. 1, the vision system comprises a first camera 13 mounted at the end of the arm 6 in proximity to the attachment 7 for connecting the tool 8.

In one or more embodiments, the vision system comprises a second camera 14 mounted on a front part of the frame 2, so as to acquire images of the scenario in front of the frame 2 at a lower height than the first camera 13.

In one or more embodiments, the vision system comprises a third camera 15 mounted on the top of the frame 2, in particular above an upper horizontal wall defining the driving cab of the vehicle 1.

In one or more embodiments, the vision system comprises a fourth camera 16 mounted on a rear end of the frame 2, in order to acquire images of the scenario that appears behind the vehicle 1.

In one or more embodiments, the vision system comprises additional cameras 17 mounted along a respective side panel of the frame 2.

Of course, the terms front, rear and side refer to the condition of the vehicle operating on the ground, for example, as illustrated in FIG. 1.

According to a further characteristic, one or more of the aforesaid cameras 13, 14, 15, 16, 17, in particular the third camera 15, may be 360° omnidirectional cameras to maximize the field of view covered by the camera lens.

As previously indicated, the vision system also comprises at least one detection device for determining the distance of an object external to the vehicle 1, possibly framed by one of the aforesaid cameras.

The term detection instrument refers to a device capable of detecting the presence of objects external to the vehicle, for example, with radar or lidar technology or stereo cameras, determining the position and distance of an object from the point wherein the device is positioned. According to a technique known in itself, the operation is based on the principle of transmission and reception of a signal intercepted by external objects.

In this perspective, in one or more embodiments, the vision system comprises a first detection device 18 positioned at the end of the arm 6 near the attachment 7.

The vision system also comprises at least one second detection instrument 19 positioned, preferably, on the front part of the frame 2, in proximity to the second camera 14 and, alternatively, also on the rear part of the frame 2, in proximity to the fourth camera 16.

FIGS. 2, 3 are schematic views of the vehicle that highlight the field of vision generated by the individual components of the system described above. More specifically, in FIG. 2, the reference 13' indicates the field of vision of the first camera 13, the reference 15' indicates the field of vision, preferably spherical, of the third camera 15, and the references 14',16', 17' indicate the fields of vision of the second camera 14, the fourth camera 16 and the side cameras 17, respectively. In FIG. 3, the references 18' and 19' indicate, respectively, the detection areas of the first detection device and the second detection device.

In light of the characteristics described above, it will be appreciated that the vehicle 1 is equipped with instrumentation capable of generating a complete mapping of the surrounding scenario, so as to make available a multitude of data to be displayed, if necessary, following processing.

Figure 4:
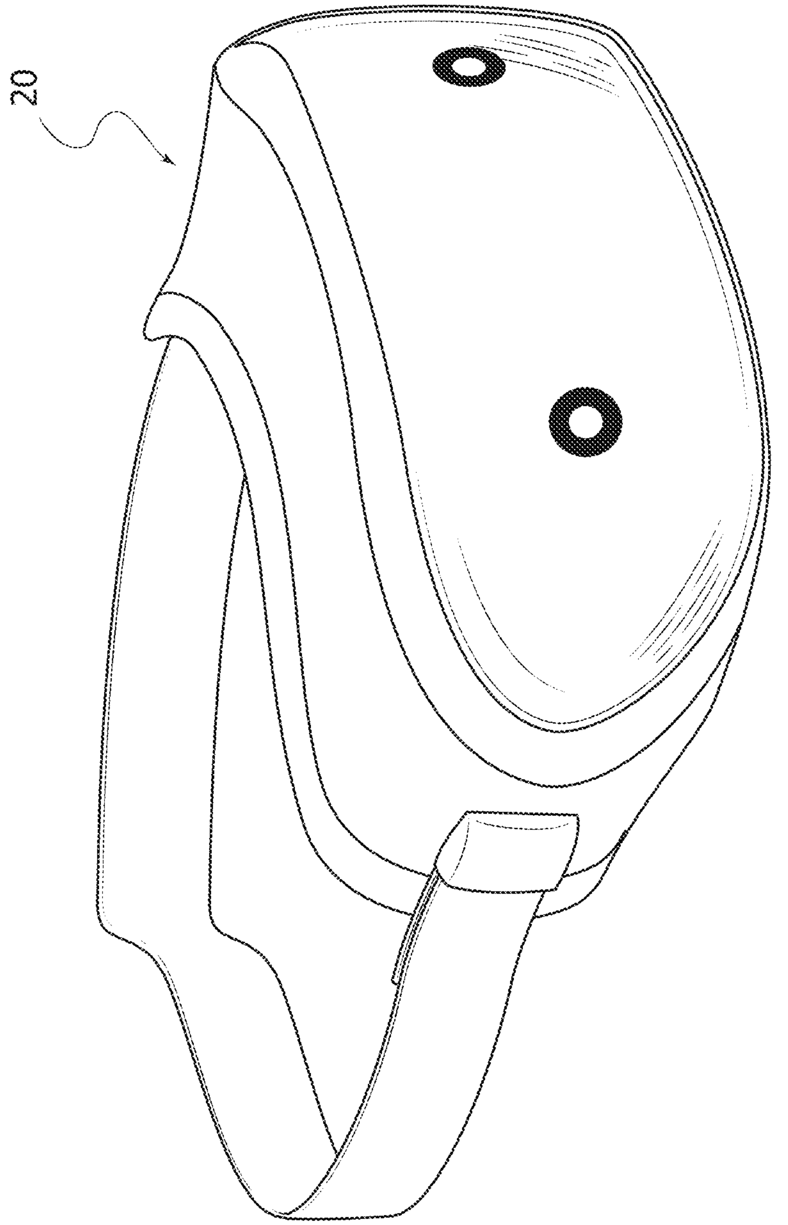
FIG. 4 is a perspective view illustrating a mixed-reality viewer device with video pass-through according to one embodiment.

According to a further characteristic of the present invention, illustrated by way of example in FIG. 4, the vehicle 1 comprises a mixed-reality viewing device 20 of the head-up display type with video pass-through, wearable by an operator and operationally connectable to the electronic control unit E of the vehicle 1.

In one or more embodiments, the viewing device 20 comprises a display element to be placed in front of the operator's eyes and a support structure to stably position the viewing device 20 on the operator's head. The support structure may comprise, for example, a band that wraps around the operator's head and/or side support rods.

Advantageously, the device thus created allows the operator to view mixed-reality information directly in front of his eyes, thus improving visual perception, without having to look away from the field of vision during maneuvers, and also to continue to view the information even in the case of remote control of the vehicle (outside the cab).

The term "video pass-through" refers to a visor designed to allow the operator wearing the visor to view the real surrounding environment. The real world can then be viewed through the display element of the visor, by superimposing virtual elements (e.g. reconstructed 3D objects, textual information, graphics, etc.) onto the real environment.

As will be appreciated below, the viewing device 20 allows a plurality of information on the surrounding environment to be displayed before the eyes, which is of assistance in driving the vehicle and managing the lifted load, following processing of the data acquired by the vision system.

In one or more embodiments, the viewing device 20 comprises an electronic processor (not illustrated) operatively in communication with the electronic unit E of the vehicle, to receive display data acquired by the vision system present on board the vehicle, possibly in correlation with the processing carried out by the unit E.

In this regard, in one or more embodiments, the viewing device 20 is configured to receive a plurality of data detected by the electronic unit E of the vehicle, by the vision system and by other devices in the on-board or remote control station, and to process said data in order to generate a mixed-reality visualization of the surrounding environment and of the vehicle, combining the real physical environment and virtual elements specifically generated to facilitate real-time driving of the vehicle and load management.

In all embodiments, vehicle 1 is therefore designed to acquire, through the vision system, a plurality of data relating to events and/or objects outside the vehicle during real-time use of the vehicle itself. The data may be transmitted automatically, for example, wirelessly or via cable, to the viewer device 20, with or without related processing by the electronic unit E.

According to a further characteristic, the electronic unit E of the vehicle 1 and/or the processor of the viewing device 20 are configured to use automatic data analysis algorithms based on machine learning principles, in order to integrate the acquired data and provide the user with a mixed-reality visualization of the environment.

As is known, the operator sitting inside the driving cab of the vehicle, or from a remote position may in some cases have his view obstructed by objects that interpose themselves along his field of vision. In particular, external objects or parts of the vehicle itself such as the front uprights forming the driving cab, may prevent the complete view of the surrounding environment from different angles, generating significant difficulties in maneuvering the vehicle itself or in moving the load raised at the end of the lifting arm, in compliance with the safety and stability requirements indicated above.

In this perspective, according to a first advantageous characteristic, the mixed-reality visualization allows an external view to be obtained with respect to the vehicle, free from objects that prevent the complete vision of the environment to the operator sitting in the cab or from a remote position.

In other words, the viewing device 20 then displays a mixed reality reproduction with parts of the surrounding environment hidden from the view of the operator at the vehicle controls in the cab or from a remote location.

According to a further preferred characteristic, by means of at least one control element associated with the viewing device 20, such as for example a push-button panel separate from the device 20 or a built-in key, the user will be able to move the observation point, for example, to the distal end of the arm 6, or will be able to select further observation modes, for example, showing some elements of the machine in transparency or removing others.

According to a further preferred characteristic, the mixed-reality viewer device 20 is configured to show several overlaid pieces of information useful to the operator for driving the vehicle and managing the lifted load, such as the type of tool 8 connected and weight of the lifted load.

Figure 5:
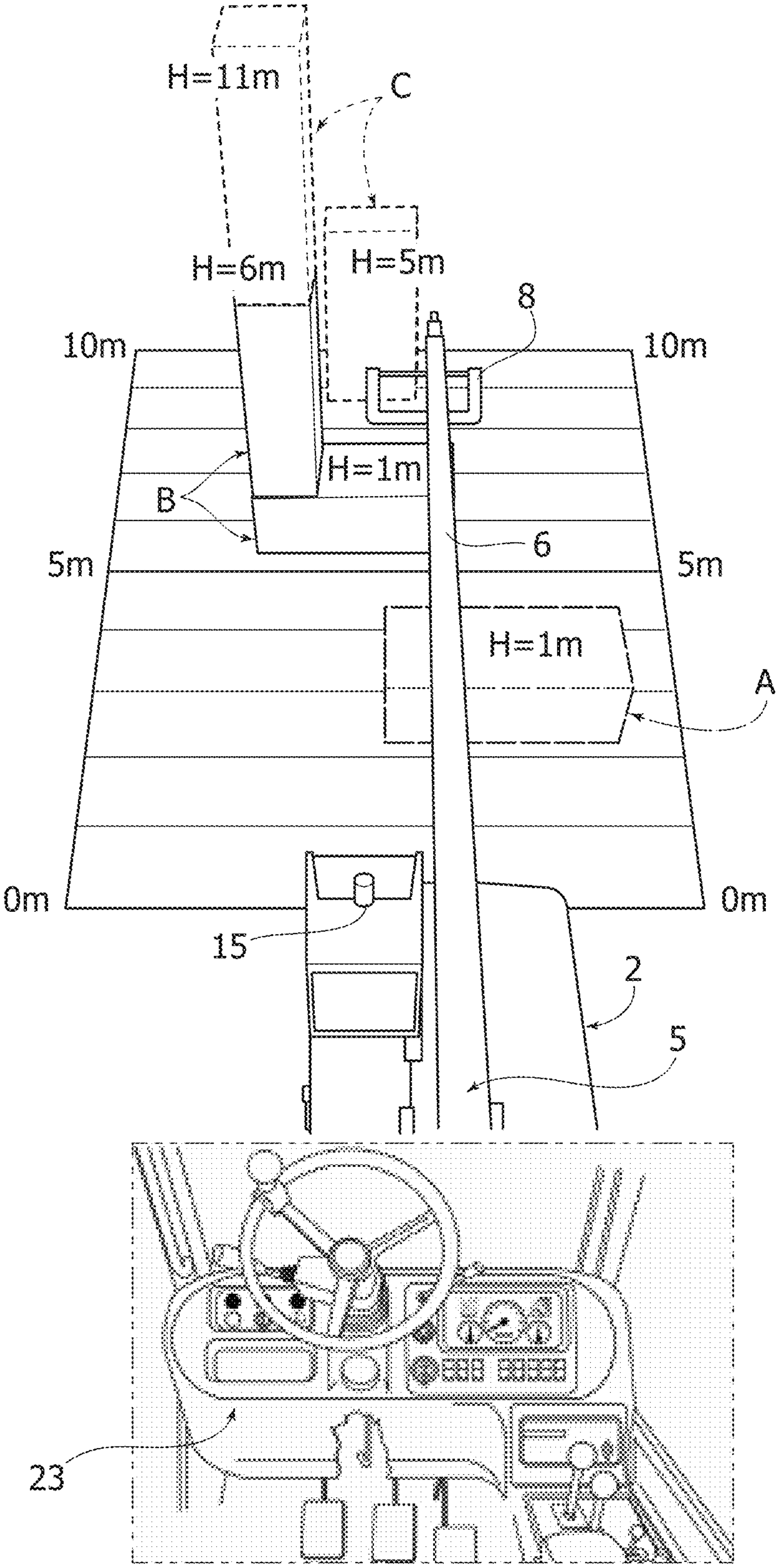
FIGS. 5-7 are further schematic views illustrating some examples of information generated by the mixed-reality viewer device.

As previously indicated, the viewing device 20 is configured to generate a mixed-reality display, illustrated by way of example in FIG. 5, combining the real physical environment and virtual elements specifically generated to facilitate real-time vehicle driving and load management, thanks to the further possibility of combining this display with that of the control devices 23 of the position use acquired via video pass-through.

Figure 6:
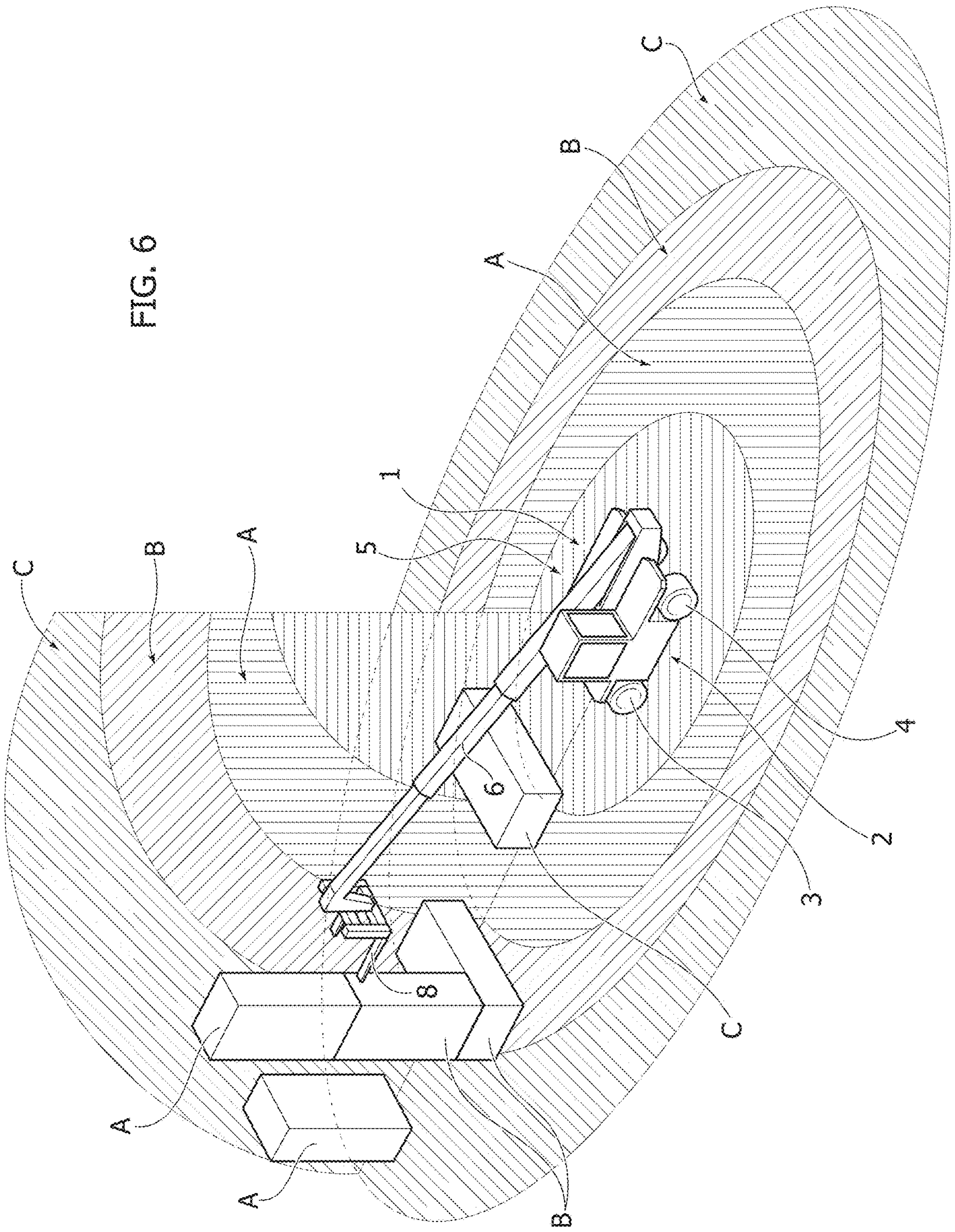
Figure 7:
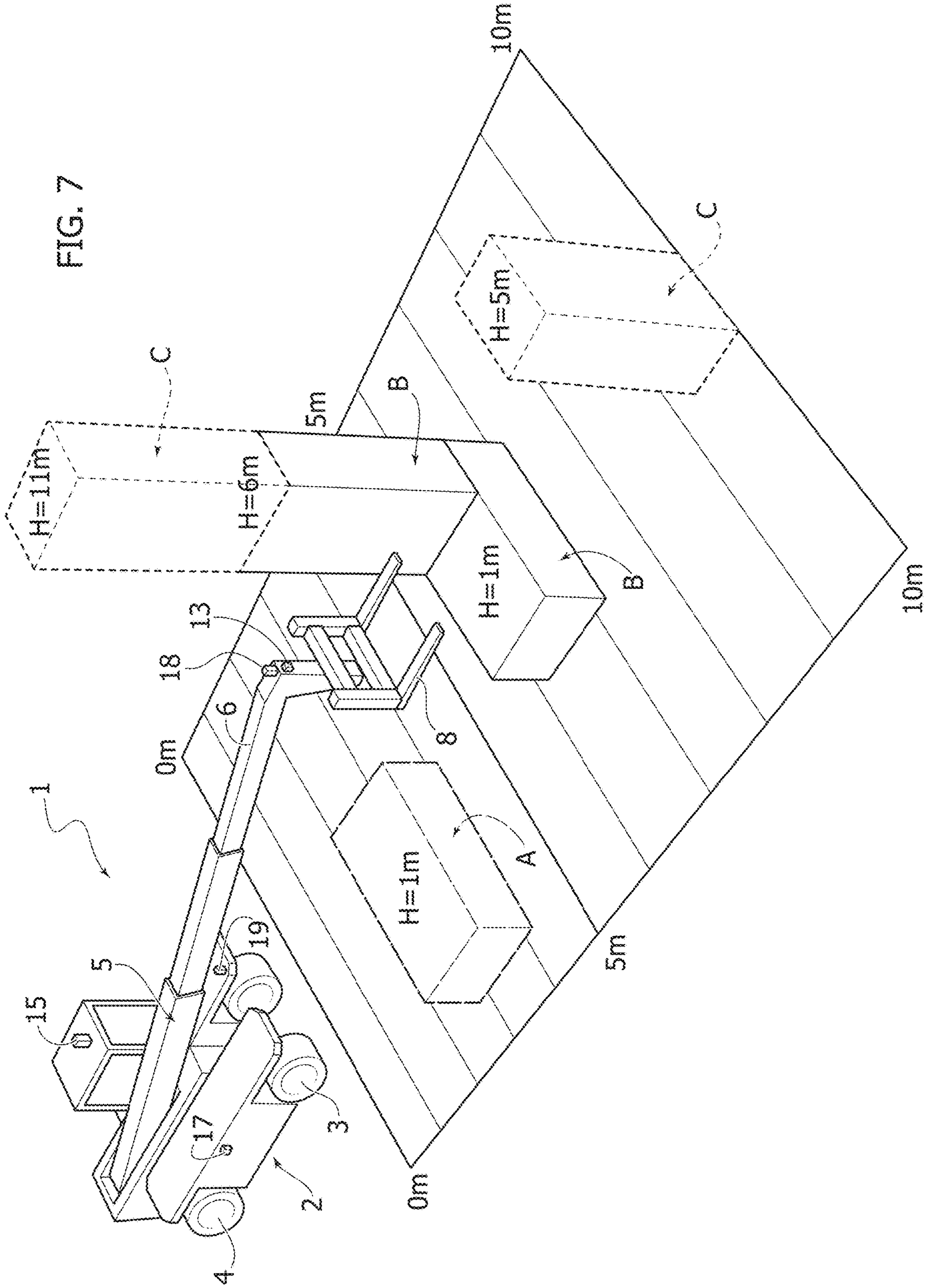

According to a further advantageous characteristic, illustrated by way of example in FIGS. 5-7, the mixed-reality visualization comprises a visualization of the various elements of the surrounding environment, associating these elements with different colored load bands as a consequence of the possibility of controlling the vehicle to interact with a given element in safe or unsafe conditions. In other words, the surrounding environment may be visualized according to relative sub-areas, in particular:

areas with permitted operations A (for example, displayed in green), both due to the possibility of reaching a point within these areas, and due to the possibility of managing the lifted load while respecting the stability requirements based on the lifted load and the position of the arm;

areas with operations close to the permitted limit B (for example, displayed in yellow); and areas with prohibited operations C (for example, displayed in red), due to the impossibility of reaching a point within that area or due to the impossibility of managing the lifted load while respecting the stability requirements based on the lifted load and the position of the arm.

The calculation of the relative sub-areas A, B, C originates from the multitude of data acquired with the cameras 13, 14, 15, 16, 17, the detection devices 18, 19 and the sensors 10, 11, 12, 21, 22 on board the vehicle which detect various operating parameters of the vehicle itself (type of tool, total weight of the load, arm inclination angle, arm length, etc.)

Please note that the reproductions illustrated in FIGS. 5-7 are shown purely as non-limiting examples, as the reproduction viewed by the operator reflects the observation point of the operator seated in the driving cab.

According to a further advantageous characteristic, in addition to the aforesaid augmented reality display with load bands A, B, C, the displayed information comprises a grid of values for indicating the distances and heights of the various elements of the surrounding environment.

As an example, FIG. 7 shows the front value grid, but this can also be the rear one.

Therefore, by means of the augmented reality viewing device 20 connected to the electronic unit E and the vision system mounted on the vehicle 1, the operator is constantly informed in real time about the operations that can be carried out by the vehicle 1 in accordance with the stability and safety conditions, so as to operate up to the limit of the capabilities of the vehicle, or maintaining a safe distance from external objects, without risking incurring maneuver errors caused by an incorrect assessment of the surrounding environment or obstacles to the operator's complete vision. The operator will constantly have before his eyes the main information needed to drive the vehicle, without having to carefully evaluate the environment based on his subjective perception and his knowledge of the stability capabilities of the vehicle.

Figure 8:
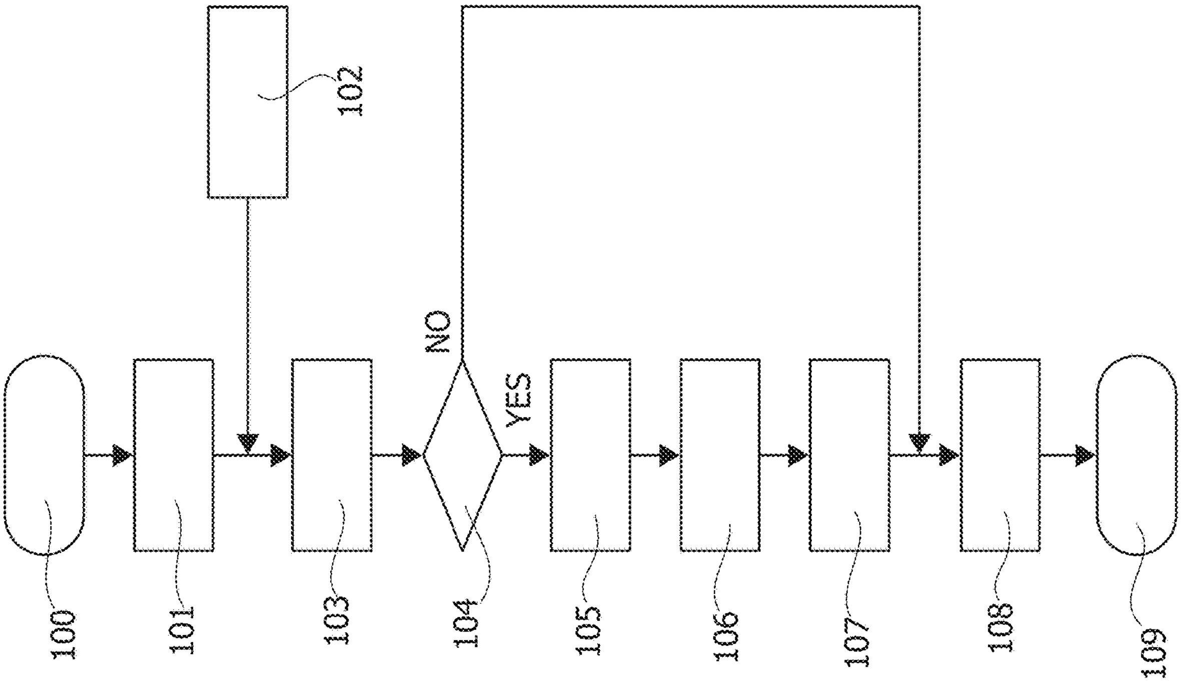
FIG. 8 is a flow chart illustrating a sequence of operation of the vehicle illustrated in the previous figures.

In light of the characteristics described previously, FIG. 8 shows a flow diagram illustrating the operation of the vehicle 1 and the related augmented-reality viewing device, according to an embodiment:

block 100 shows the start of the operations to use the vehicle and the related augmented-reality viewing device;

block 101 indicates a detection step of the parameters of the lifted load;

block 102 indicates the possibility of calculating a relative load diagram;

block 103 shows a preliminary setup step carried out using the control devices 23 in the cab or with a remote control;

block 104 shows the possibility of wearing the mixed-reality headset with video pass-through;

if so, block 105 illustrates a scanning step of the surrounding environment using the vision system;

block 106 indicates a processing step of the data acquired by the vision system;

block 107 indicates a step of displaying the processed images on the viewer;

block 108 illustrates a load handling step, and;

block 109 indicates the end of the operating steps of driving the vehicle.

Of course, without prejudice to the principle of the invention, the details of construction and the embodiments may vary widely with respect to those described and illustrated purely by way of example, without departing from the scope of the present invention, as determined by the attached claims.

The invention claimed is:

1. A multifunctional lifting vehicle comprising:

a base frame, a lifting assembly including at least one operating arm equipped with an attachment for mounting a tool, a control system of the lifting assembly, comprising at least one electronic control unit and a plurality of sensors arranged to acquire a plurality of stability data of the vehicle, including a position of the at least one operating arm relative to the base frame and an amount of a load lifted by the tool, a vision system mounted on the base frame, comprising at least one camera configured to acquire images and detect events occurring outside the vehicle, and at least one detection device to measure a distance of an external object outside the vehicle, wherein said multifunctional lifting vehicle also comprises:

a mixed-reality viewing device of a head-up display type with video pass-through, operatively connected to said electronic control unit, configured and programmed to generate a mixed-reality visualization of a surrounding environment of the vehicle on a basis of data acquired through the vision system, by combining a real physical environment with virtual elements specifically generated to facilitate in real time driving of the vehicle with management of the load, wherein said mixed-reality viewing device of the head-up display type with video pass-through, is a device configured to be wearable by an operator and operationally connectable to the electronic control unit of the vehicle, said wearable device comprising a display element configured to be placed in front of the operator's eyes and a support structure configured to stably position the device on a head of the operator.

2. The multifunctional lifting vehicle according to claim 1, wherein the electronic control unit is arranged for controlling respective operating valves of a hydraulic circuit for operating the lifting assembly.

3. The multifunctional lifting vehicle according to claim 1, wherein the control system comprises an identification unit configured for identifying a type of tool applied to the at least one operating arm.

4. The multifunctional lifting vehicle according to claim 1, wherein the vision system comprises one or more of the following cameras:

a first camera mounted at an end of the at least one operating arm in proximity of the attachment for connecting the tool, a second camera mounted on a front part of the base frame, so as to acquire images of a scenario in front of the base frame at a lower height than the first camera, a third camera mounted on a top of the base frame, including above an upper horizontal wall defining a driving cab of the vehicle, a fourth camera mounted on a rear end of the base frame, in order to acquire images of a scenario that appears behind the vehicle, additional cameras mounted along a respective side panel of the base frame.

5. The multifunctional lifting vehicle according to claim 1, wherein said at least one detection device is configured to transmit/receive signals with radar or lidar technology or stereo cameras, for detecting a presence of external objects and calculating a position and distance of the external objects relative to the vehicle.

6. The multifunctional lifting vehicle according to claim 5, wherein the vision system comprises a first detection device positioned at an end of the at least one operating arm and/or a second detection instrument positioned on a front part of the base frame.

7. The multifunctional lifting vehicle according to claim 1, wherein the mixed-reality viewing device comprises an electronic processor operatively in communication with the electronic unit of the vehicle, to receive data acquired by means of said plurality of sensors and the vision system.

8. The multifunctional lifting vehicle according to claim 7, wherein the electronic unit of the vehicle and/or the processor of the mixed-reality viewing device are configured to use automatic data analysis algorithms based on principles of machine learning.

9. The multifunctional lifting vehicle according to claim 1, wherein said mixed-reality visualization comprises a reproduction of some parts of the surrounding environment which are hidden from a view of the operator located at a control station of the vehicle, onboard or remote, combined with a view of related control devices.

10. The multifunctional lifting vehicle according to claim 1, wherein the vehicle comprises at least one control element associated with the mixed-reality viewing device, for varying an observation point of a mixed reproduction and/or a viewing mode of some vehicle parts.

11. The multifunctional lifting vehicle according to claim 1, wherein the mixed-reality viewing device is configured to show several overlaid pieces of information to the operator for driving the vehicle and managing the lifted load, including a type of tool connected and/or a position and weight of the lifted load.

12. The multifunctional lifting vehicle according to claim 1, wherein said mixed-reality visualization includes a visualization of various elements of the surrounding environment, and associating such elements with different load bands in connection with controlling the vehicle to interact with a determined element in safe conditions or not.

13. The multifunctional lifting vehicle according to claim 12, wherein said load bands are reproduced according to different sub-areas of an overall area of the work environment, in particular:

areas with permitted operations, wherein the vehicle may reach a point included in these areas, and manage the lifted load, by respecting stability requirements depending on the lifted load and the position of the at least one operating arm;

areas with operations in a proximity of the areas with permitted operations; and areas with prohibited operations, wherein the vehicle is unable to reach a point included in these areas or to manage the lifted load, by respecting stability requirements depending on the lifted load and the position of the at least one operating arm.

14. The multifunctional lifting vehicle according to claim 13, wherein the information displayed comprises a grid of values for indicating distances and heights of the various elements of the surrounding environment.

15. A method for managing the load moved by the multifunctional lifting vehicle according to claim 1, comprising:

connecting the mixed-reality viewing device to the electronic unit of the vehicle;

activating the vision system;

controlling the vehicle from a driving cab of said vehicle or from a remote location; and generating the mixed-reality visualization of the surrounding environment on the basis of data acquired through the vision system, by combining the real physical environment with virtual elements specifically generated to facilitate in real time driving of the vehicle and the load management.

* * * * *